(12) United States Patent
Maeda

(10) Patent No.: US 7,913,648 B2
(45) Date of Patent: Mar. 29, 2011

(54) WATER DRINKING CONTAINER FOR ANIMALS

(76) Inventor: Yasushi Maeda, Kobe (JP)

( * ) Notice: Subject to any disclaimer, the term of this patent is extended or adjusted under 35 U.S.C. 154(b) by 0 days.

(21) Appl. No.: 12/868,371

(22) Filed: Aug. 25, 2010

(65) Prior Publication Data
US 2010/0313815 A1 Dec. 16, 2010

Related U.S. Application Data

(62) Division of application No. 11/939,843, filed on Nov. 14, 2007, now abandoned.

(51) Int. Cl.
*A01K 7/00* (2006.01)
(52) U.S. Cl. .......... 119/61.52; 119/72; 119/51.5
(58) Field of Classification Search .......... 119/61.5, 119/61.52, 72, 74, 73, 60, 61.1, 51.5, 61.53; D30/129, 132, 133; 220/574.2; 206/519; 62/457.1, 457.2, 457.3, 457.4, 457.5, 457.6, 62/463, 529, 459
See application file for complete search history.

(56) References Cited

U.S. PATENT DOCUMENTS

| | | | | |
|---|---|---|---|---|
| 2,810,276 A * | 10/1957 | Murray | ........ | 62/457.6 |
| 3,631,840 A * | 1/1972 | McCormack | ........ | 119/51.12 |
| 4,691,664 A | 9/1987 | Crowell | | |
| 4,899,693 A * | 2/1990 | Arnold | ........ | 119/28.5 |
| 4,989,419 A | 2/1991 | Brando et al. | | |
| 5,005,524 A | 4/1991 | Berry | | |
| 5,031,575 A * | 7/1991 | Phillips | ........ | 119/61.53 |
| 5,140,134 A * | 8/1992 | Reusche et al. | ........ | 219/441 |
| 5,307,647 A * | 5/1994 | McClure | ........ | 62/371 |
| 5,345,063 A | 9/1994 | Reusche et al. | | |
| 5,619,952 A * | 4/1997 | Walker | ........ | 119/61.53 |
| 5,787,839 A * | 8/1998 | Magnant et al. | ........ | 119/51.5 |
| 6,230,653 B1 | 5/2001 | Tobin | | |
| 7,387,082 B1 * | 6/2008 | Fried | ........ | 119/61.5 |
| 7,392,761 B2 * | 7/2008 | Kujawa et al. | ........ | 119/61.5 |
| 2005/0056226 A1 | 3/2005 | Ruggiero, Jr. | | |

FOREIGN PATENT DOCUMENTS

| | | |
|---|---|---|
| JP | 2005110522 A | 4/2005 |
| JP | 2005295981 A | 10/2005 |
| JP | 2006333860 A | 12/2006 |

* cited by examiner

*Primary Examiner* — T. Nguyen
(74) *Attorney, Agent, or Firm* — St. Onge Steward Johnston & Reens LLC

(57) ABSTRACT

A water drinking container for animals is provided with which the temperature of water placed therein can be suppressed over a long period of time, especially during a period of high air temperature, to make water readily drinkable for a dog or other animal to weak from heat and make it easy for the animal to weather the heat by adequate hydration, the water drinking container being simple in arrangement, being available inexpensively, and including: a water container, having an upwardly-open, water containing recess; a cold reserving material, contained in a bag or a plastic case; and a cold reserving material container, holding the cold reserving material in a state of contact with a bottom rear surface of the water containing recess of the water container.

1 Claim, 4 Drawing Sheets

WATER DRINKING CONTAINER FOR ANIMALS

CROSS-REFERENCE TO RELATED APPLICATIONS

This patent application is a divisional of U.S. patent application Ser. No. 11/939,843, filed Nov. 14, 2007, which application is currently pending and which application is hereby incorporated by reference herein in its entirety.

FIELD OF THE INVENTION

The present invention relates to a water drinking container for such animals as dogs, cats, etc. that are kept as pets and especially relates to a water drinking container favorable for dogs.

BACKGROUND OF THE INVENTION

As is well known, dogs do not have sweat glands except on footpads on their soles, and after exercise or when the air temperature is high as in the summer, dogs open their mouths widely, droop their tongues, and breath in a panting manner mainly to cause water in the oral cavity to evaporate and suppress body temperature rise by a cooling action of the heat of evaporation. However, because such a body temperature regulating mechanism is far inferior in efficiency in comparison to body temperature regulation by sweating as in humans and horses, dogs generally cope less well with heat than they do with cold.

Although for a dog that is weak from heat, frequent replenishment of water is thus necessary at times of high temperature, water in a water drinking container that is placed outdoors warms especially rapidly due to insulation and external air temperature and because such water cannot be drunk even if the dog is thirsty, body temperature regulation fails and leads to debilitation in many cases.

Although conventionally as water drinking containers for dogs, cats, and other animals, a container, arranged to eliminate fallen hair that float on the water surface (Patent Document 1), a container, arranged for placement of a drug for water quality improvement (Patent Documents 1 and 2), etc. have been proposed, the abovementioned problem of water temperature rise is not taken into consideration in these arrangements. Also, although there are devices that electrically cool water for pet animals, these have not become generally popular due to being large in arrangement and expensive.

[Patent Document 1] Japanese Published Unexamined Patent Application No. 2006-333860
[Patent Document 2] Japanese Published Unexamined Patent Application No. 2005-110522.
[Patent Document 3] Japanese Published Unexamined Patent Application No. 2005-295981.

SUMMARY OF THE INVENTION

The present invention has been made in view of the above circumstances, and an object thereof is to provide a water drinking container for animals that is simple in structure, can be obtained inexpensively, and enables temperature rise of water placed therein to be suppressed over a long period of time, especially in a period of high air temperature, to enable water to be drunk readily by dogs and other animals to weak from heat and make it easy for such animals to weather the heat through adequate hydration.

To achieve the above object, a water drinking container for animals according to the present invention includes: a water container, having an upwardly-open, water containing recess; a cold reserving material, contained in a bag or a plastic case; and a cold reserving material holding means (cold reserving material container, cold reserving material containing portion, pocket), holding the cold reserving material in a state of contact with a bottom rear surface of the water containing recess of the water container.

With the water drinking container according to the present invention, because the cold reserving material can be held in contact with the bottom rear surface of the water containing recess of the water container, the water placed in the water containing recess can be cooled continuously by a cooling action of the cold reserving material. Thus even at an outdoor location during summer when the air temperature is hot, warming of water W dispensed into the water containing recess can be suppressed over a long period of time, thereby enabling a dog or other pet animal to drink the water W readily and making it easier for the animal to weather the heat through adequate hydration. Also, because the water drinking container as a whole is made simple in structure and a commercially available product of suitable size can be used as the cold reserving material, the manufacturing cost can be kept low, and for a user, the economic burden is made low because the cold reserving material 2 can be used repeatedly by freezing in a freezer compartment of a household electric refrigerator, etc.

Other objects shall be made clear by the description that follows.

DETAILED DESCRIPTION OF THE INVENTION

Figure 1:
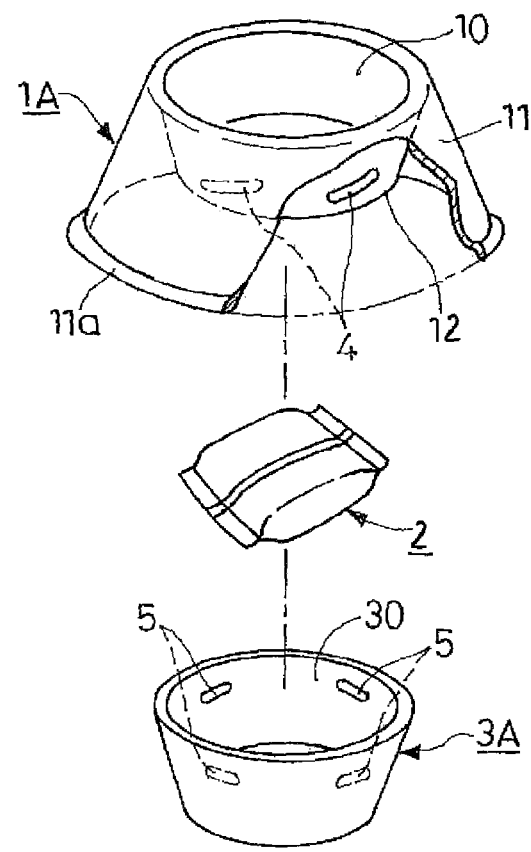
FIG. 1 is a partially cutaway exploded perspective view of a water drinking container for animals of a first embodiment according to the present invention.
Figure 2:
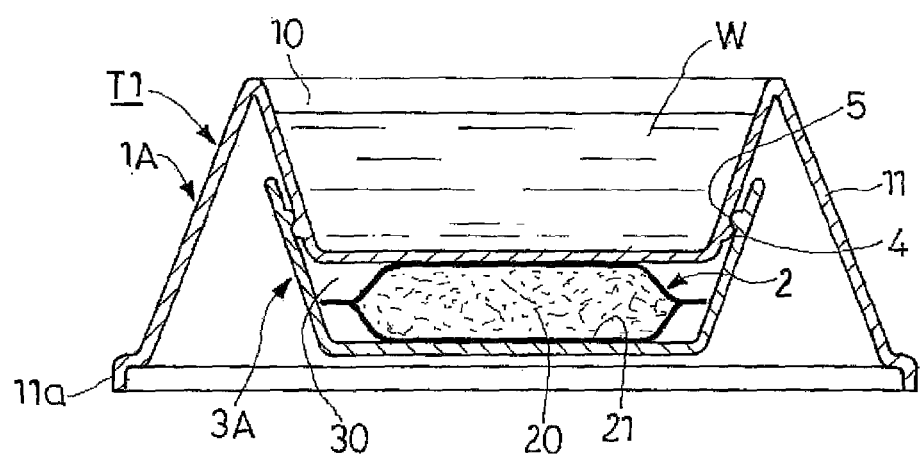
FIG. 2 is a longitudinal section of the water drinking container for animals according to the first embodiment.
Figure 3:
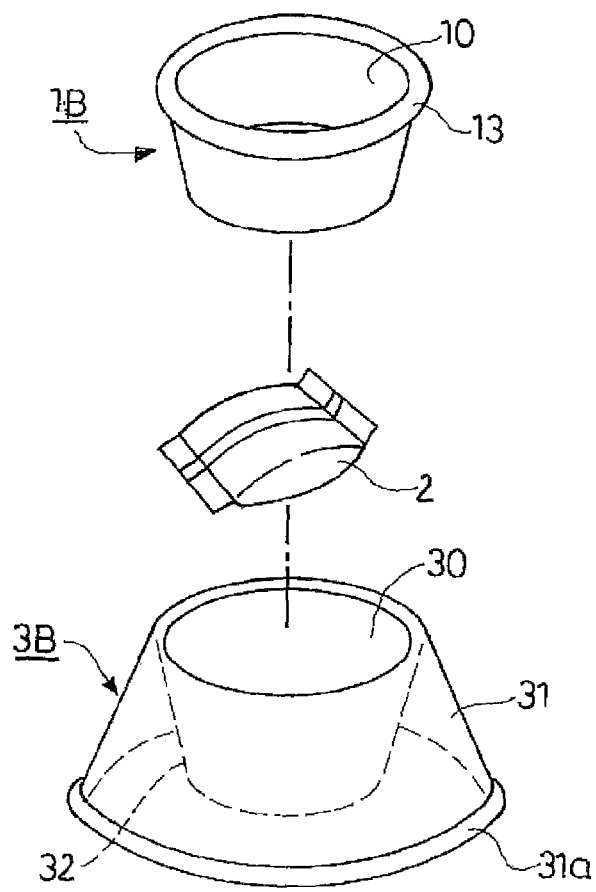
FIG. 3 is a partially cutaway exploded perspective view of a water drinking container for animals of a second embodiment according to the present invention.
Figure 4:
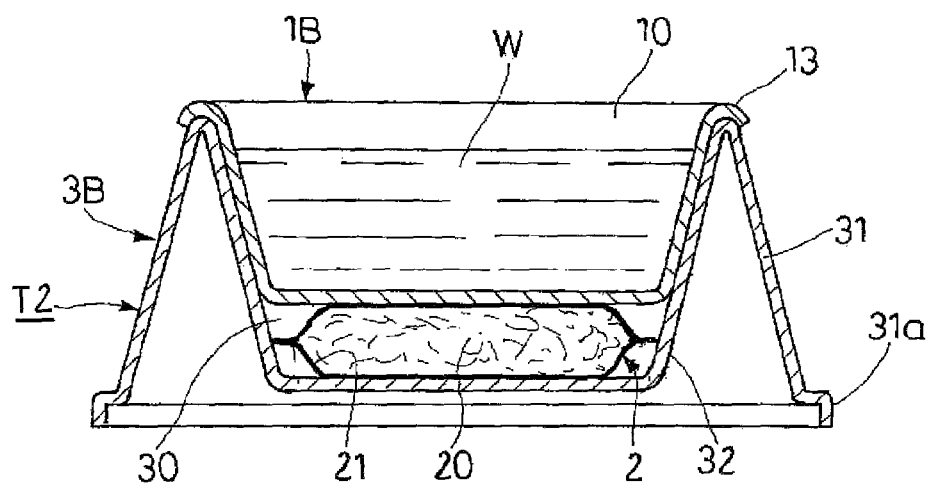
FIG. 4 is a longitudinal section of the water drinking container for animals according to the second embodiment.
Figure 5:
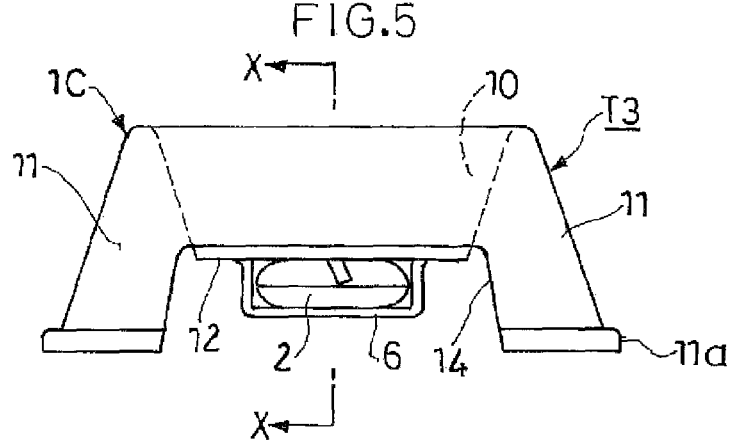
FIG. 5 is a front view of a water drinking container for animals of a third embodiment according to the present invention.
Figure 6:
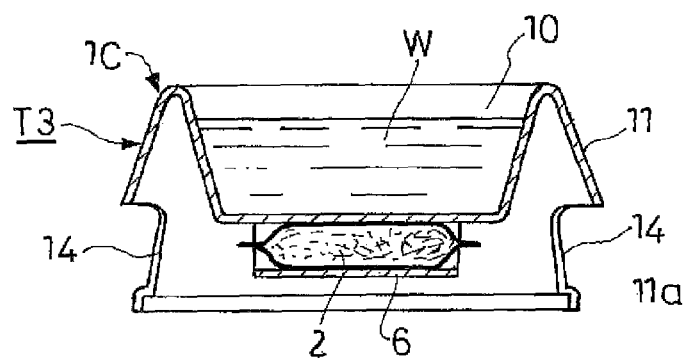
FIG. 6 is a longitudinal section of the water drinking container for animals of the third embodiment according to the present invention.
Figure 7:
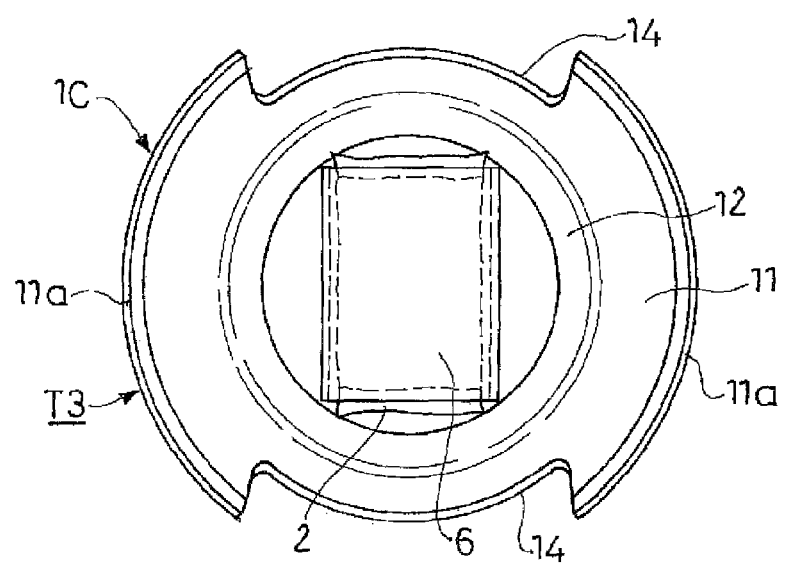
FIG. 7 is a bottom view of a water drinking container for animals of the third embodiment according to the present invention.
Figure 8:
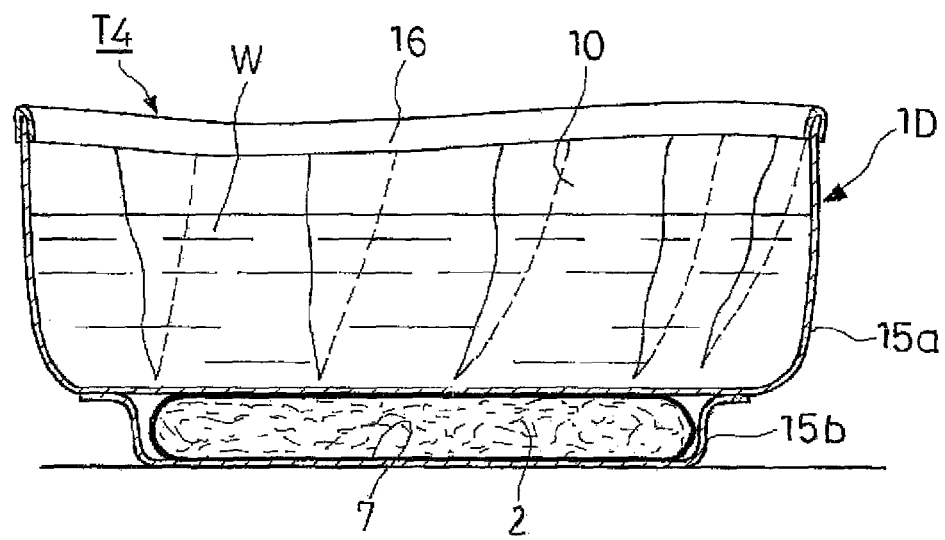
FIG. 8 is a longitudinal section of the water drinking container for animals of a fourth embodiment according to the present invention.
Figure 9:
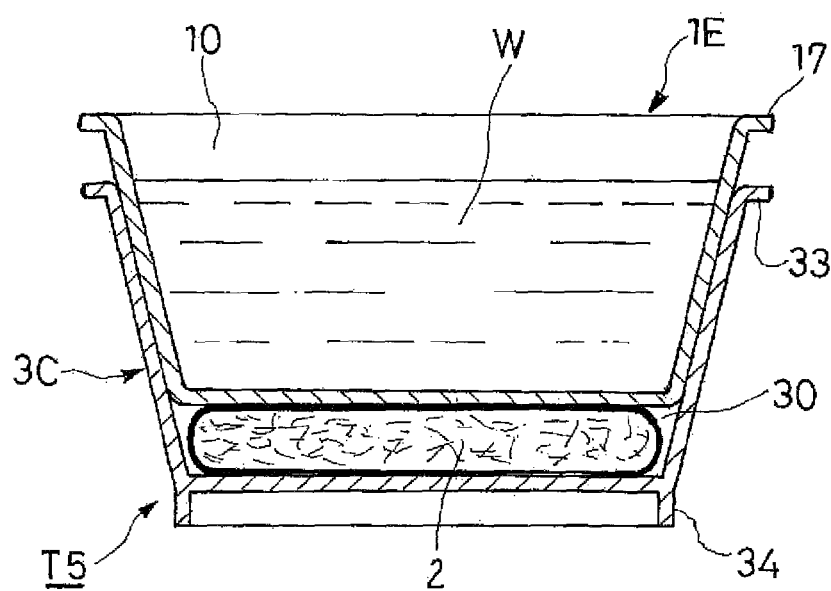
FIG. 9 is a longitudinal section of a water drinking container for animals of a fifth embodiment according to the present invention.

Embodiments of a water drinking container for animals according to the present invention shall now be described specifically with reference to the drawings. FIGS. 1 and 2 show a first embodiment, FIGS. 3 and 4 show a second embodiment, FIGS. 5 to 7 show a third embodiment, FIG. 8 shows a fourth embodiment, and FIG. 9 shows a fifth embodiment. Components that are in common to the first to fifth embodiments in terms of function are provided with the same symbols to avoid redundant description.

A water drinking container T1 for animals according to the first embodiment, shown in FIGS. 1 and 2, is constituted of: a water container 1A of truncated conical shape, having an upwardly-open, water containing recess 10 at an upper surface side; a cold reserving material 2, with which a cold reserving material composition 20 of viscous, liquid form is sealed in a plastic bag 21; and a simple, cup-shaped cold reserving material container 3A, having an upwardly-open, cold reserving material containing recess 30.

With the water container 1A, a somewhat collar-like lower edge of an outer peripheral skirt portion 11 serves as a grounded portion 11a, the water containing recess 10 that increases in diameter upwardly constitutes, at a rear surface side, a downwardly protruding portion 12 that decreases in diameter downwardly, and a plurality (four in the figure) of spiral protruding strips 4 are formed in an equally distributed manner in a circumferential direction at positions at a lower side of an outer peripheral surface of the downwardly protruding portion 12. Meanwhile, the cold reserving material container 3A increases in diameter upwardly in correspondence to the downwardly protruding portion 12 of the water container 1A and has a plurality (four in the figure) of laterally elongate protrusions 5 formed in an equally distributed manner in a circumferential direction at positions at an upper side of an inner peripheral surface, that is, the cold reserving material containing recess 30.

With the water drinking container T1 for animals of the first embodiment, the cold reserving material 2 is loaded inside the cold reserving material containing recess 30 of the cold reserving material container 3A, and the assembled form shown in FIG. 2 is arranged by externally fitting the cold reserving material container 3A onto the downwardly protruding portion 12 of the water container 1A and twisting in a clockwise direction to make the protrusions 5 of the cold reserving material container 3A ride above the spiral protruding strips 4 of the downwardly protruding portion 12 of the water container 1A and thereby fit the cold reserving material container 3A onto the downwardly protruding portion 12 in a screw-tightening manner and make the cold reserving material 2 inside the cold reserving material container 3A contact a bottom surface of the downwardly protruding portion 12. The dimensions of the cold reserving material container 3A that is fitted onto the downwardly protruding portion 12 of the water container 1A are set so that in the assembled form, a lower end of the cold reserving material container 3A is in an ungrounded state and is raised higher than the grounded portion 11a of the water container 1A.

A water drinking container T2 for animals according to the second embodiment, shown in FIGS. 3 and 4 is constituted of a water container 1B of simple, cup-like shape, having the upwardly-open, water containing recess 10, the cold reserving material 2 of the same form as that of the first embodiment described above, and a cold reserving material container 3B of truncated conical shape having the upwardly-open, cold reserving material containing recess 30 at an upper surface side. As with the water container 1A in the first embodiment, with the cold reserving material container 3B, a somewhat collar-like lower edge of an outer peripheral skirt portion 31 serves as a grounded portion 31a, the cold reserving material containing recess 30 that increases in diameter upwardly constitutes, at a rear surface side, a downwardly protruding portion 32 that decreases in diameter downwardly, and a lower end of the downwardly protruding portion 32 is positioned higher than the grounded portion 31a. Meanwhile, the water container 1B increases in diameter upwardly, an upper end circumferential edge thereof forms an outwardly directed collar portion 13, and by internally fitting the water container 1B from above into the cold reserving material containing recess 30, loaded with the cold reserving material 2, of the cold reserving material container 3B, the cold reserving material 2 is made to contact a bottom rear surface of the water containing recess 10 and the collar portion 13 is latched to an upper end edge of the cold reserving material containing recess 30 as illustrated by the assembled form in FIG. 4.

With the water drinking container T1 or T2 for animals of the first or second embodiment described above, because the cold reserving material 2 contacts the bottom rear surface of the water containing recess 10 of the water container 1A or 1B and can suppress temperature rise of water W placed in the water containing recess 10 over a long period of time even at an outdoor location during a summer period of high air temperature, the water W is made cold and easy to drink for a pet animal and weathering of the summer period through adequate hydration is made easy, especially for dogs that are weak from heat. Also because in addition to the water drinking container being simple in arrangement as a whole, the cold reserving material 2 can be used repeatedly by freezing in a freezer compartment of a household electric refrigerator, etc., the economic burden is made low for a user, and because a commercially available product of suitable size can be used as the cold reserving material 2, the manufacturing cost can be kept low.

With the water container 1A of the water drinking container T1 according to the first embodiment and with the cold reserving material container 3B of the water drinking container T2 according to the second embodiment, because the lower edges of the outer peripheral skirt portions 11 and 31 take on truncated conical shapes with the lower edges being the grounded portions 11a and 31a and the water containing recess 10 of the former and the cold reserving material containing recess 30 of the latter respectively form downwardly protruding portions 12 and 32 at the rear surface sides, spaces that are cut off from the exterior are formed between the portions containing the cold reserving material 2 and the outer peripheral skirt portions 11 and 31, and by the heat insulating and heat retaining effects of air inside these spaces, the cooling action of the cold reserving material 2 is sustained longer. Furthermore, because the bottom rear surface of the cold reserving material container 3A that is screwed onto the downwardly protruding portion 12 of the water drinking container T1 and the bottom rear surface of the downwardly protruding portion 32 of the water drinking container T2 are both in an ungrounded state, direct heat transfer with respect to a ground surface, such as the ground on which the water drinking containers T1 and T2 are placed, etc., is prevented and the cooling action of the cold reserving material 2 is sustained correspondingly longer.

With the present invention, in place of using the cold reserving material container 3A or 3B as the cold reserving material holding means for holding the cold reserving material in a state of contact with the bottom rear surface of the water containing recess of the water container as in the first or second embodiment described above, a cold reserving material containing portion may be provided in the water container itself as in water drinking containers T3 or T4 for animals according to the third and fourth embodiments to be described below. That is, by loading a cold reserving material into such a cold reserving material containing portion, temperature rise of water placed in the water container can be suppressed in likewise manner by the cooling action of the cold reserving material.

With the water drinking container T3 for animals according to the third embodiment shown in FIGS. 5 to 7, although a water container 1C has a truncated conical shape in the same manner as the water container 1A in the first embodiment described above, and the upwardly-open, water containing recess 10 that increases in diameter upwardly at the upper surface side constitutes the downwardly protruding portion 12 at the rear surface side, a cold reserving material containing portion 6 of a laterally-long, rectangular tube form that is open at both ends in a longitudinal direction is formed integral to the bottom rear surface of the downwardly protruding portion 12, and the cold reserving material 2 is loaded in this cold reserving material containing portion 6. Moreover, the bottom rear surface of the cold reserving material containing portion 6 is set to be in an ungrounded state at a position higher than the grounded portion 11a of the outer peripheral skirt portion 11 to thereby prevent temperature rise of the cold reserving material 2 due to direct heat transfer with respect to a ground surface. Also, portions at both sides in a radial direction of the outer peripheral skirt portion 11 of the water container 1C are cut out at a predetermined width below a substantially intermediate height to form notched openings 14, and the respective open ends of the cold reserving material containing portion 6 face the respective notched openings 14 to make it easy to place and take the cold reserving material 2 in and out of the cold reserving material containing portion 6.

With the water drinking container T4 for animals of the fourth embodiment shown in FIG. 8, on a bottom rear surface of a water container 1D, formed of a synthetic resin-impregnated fabric cloth or other non-water-permeable, flexible sheet 15a, a pocket 7 is formed of a flexible sheet 15b of the same form, and the cold reserving material 2 is contained in this pocket 7. With this water drinking container T4, because the circular or elliptical flexible sheet 15a is folded overlappingly at prescribed intervals at a peripheral side and a list 16 is sewn to a peripheral edge to form a three-dimensional, container-like form as the water container 1D, and because the flexible sheet 15b of the pocket 7 is fused to a periphery of the bottom rear surface of the water container 1D except at an entrance portion (not shown), the entire structure can be folded and stored in a non-bulky form when not being used.

Although in the water drinking container T3 according to the third embodiment, the cold reserving material containing portion 6 is formed integral to the bottom rear surface of the downwardly protruding portion 12 of the water container 1C, such a cold reserving material containing portion may be arranged as a structure that opens and closes by means of a hinge or a structure that is slid in a drawer-like manner. A structure, with which the pocket 7 of the cold reserving material containing portion in the water drinking container T4 according to the fourth embodiment is fixed to the water container 1D via a hook or button, can also be employed.

Various arrangements besides the first to fourth embodiments described above are possible for the water drinking container for animals according to the present invention. As a simplest arrangement for example, there is an arrangement where two, simple container forms are overlapped in a vertically fitted state with a cold reserving material sandwiched in between as in a water drinking container T5 for animals according to the fifth embodiment shown in FIG. 9. The water drinking container T5 of the fifth embodiment is constituted of the cold reserving material 2 and a water container 1E and a cold reserving material container C3, both of which are simple, upwardly-open container forms of substantially equal dimensions that increase in diameter upwardly and with which upper end peripheral edges form outwardly directed collar portions 17 and 33, respectively, and by simply overlapping the water container 1E onto the cold reserving material container 3C, with the cold reserving material 2 loaded in the cold reserving material containing portion 30, the water W placed in the water containing recess 10 of the water container 1E is cooled by the cold reserving material 2 in contact with the bottom rear surface of the water container 1E. An annular protruding edge 34 is provided as a grounded portion at a bottom surface side of the cold reserving material container 3C, and this realizes suppression of heat transfer with respect to the ground surface as well as heat insulation and heat retention by an air layer at an inner side of the annular protruding edge 34.

Besides the bag-contained form described as an example above, the cold reserving material 2 may take on a form, with which the cold reserving material composition 20 is sealed in a thick-plate synthetic resin case. Also, although the cold reserving material 2 of each embodiment is of a generally commercially available form contained in a rectangular bag, for example, a cold reserving material sealed in a bag or case of disk-like form or a form matched to the cold reserving material container or cold reserving material containing portion is also favorable in terms of making large the area of contact with the bottom rear surface of the water containing recess of the water container.

Although an extremely large number of types of materials are known as the cold reserving material composition 20 used in the cold reserving material 2, in general, the cold reserving material composition 20 is constituted of a water-soluble polymer, such as polyvinyl alcohol, water-soluble cellulose ether, water-soluble polyether polyurethane, etc. or a gel-like, viscous aqueous solution containing a polysaccharide, such as carrageenan, xanthan gum, guar gum, etc., and various organic and inorganic additives are blended therein to add flexibility in a frozen state. With the present invention, any such material that is commercially available as a cold reserving material can be used without any problem as long as it can be used repeatedly upon freezing in a freezer compartment of a household electric refrigerator, etc.

There are no restrictions in particular regarding the materials of the water containers 1A to 1C and 1E and the cold reserving material containers 3A to 3C of the water drinking containers T1 to T3 and T5 for animals according to the first to third and fifth embodiments, and any of hard or semi-hard plastics, metals, ceramics, pottery, etc., can be employed.

Furthermore, the means for fitting the cup-like, cold reserving material container to the downwardly protruding portion of the water container as in the water drinking container T1 for animals of the first embodiment is not restricted to a screw engaging arrangement, and for example, an L-shaped groove may be disposed on a peripheral surface of one container, a protruding portion that fits into the groove may be disposed on an opposing peripheral surface of the other container, and arrangements may be made so that the cold reserving material container is raised or lowered with the protruding portion being fitted in a vertical portion of the groove and so that the cold reserving material container becomes latched to the downwardly protruding portion by making the protruding portion enter a horizontal portion of the groove.

With a water drinking container for animals according to a first aspect of the present invention, because the cold reserving material 2 can be held in contact with the bottom rear surface of the water containing recess 10 of any of the water containers 1A to 1E, the water W placed in the water containing recess 10 can be cooled continuously by the cooling action of the cold reserving material 2. Thus even at an outdoor location during a summer period of high air temperature, warming of the water W dispensed into the water containing recess 10 can be suppressed over a long period of time, thereby enabling a dog or other pet animal to drink the water W readily and making it easier for the animal to weather the heat through adequate hydration. Also, because the water drinking container as a whole is made simple in structure and a commercially available product of suitable size can be used as the cold reserving material 2, the manufacturing cost can be kept low, and for a user, the economic burden is made low because the cold reserving material 2 can be used repeatedly by freezing in a freezer compartment of a household electric refrigerator, etc.

With a second aspect of the present invention, because the water container 1A has the truncated conical shape with the lower edge of the outer peripheral skirt portion 11 being the grounded portion 11*a*, and the cold reserving material container 3A is arranged to be detachably attached to the downwardly protruding portion 12 that the water containing recess 10 forms at the rear surface side, a space that is cut off from the exterior is formed between the portion containing the cold reserving material 2 and the outer peripheral skirt portion 11 and by the heat insulating and heat retaining effects of air inside this space, the cooling action of the cold reserving material 2 is sustained longer.

With a third aspect of the present invention, because the cold reserving material container 3A that is fitted onto the downwardly protruding portion 12 is in a non-grounded state, direct heat transfer between a ground surface, such as the ground on which the water drinking container is placed, etc., and the cold reserving material container 3A is prevented, and the cooling action of the cold reserving material 2 is sustained correspondingly longer.

With a fourth aspect of the present invention, in the water drinking container for animal, the cold reserving material container 3A can be fitted in a stable state by screwing onto the downwardly protruding portion 12 of the water container 1A and the cold reserving material container 3A can be attached and detached readily by a twisting operation in exchanging the cold reserving material 2.

With a fifth aspect of the present invention, because in usage, the cold reserving material 2 is contained in the upwardly-open, cold reserving material containing portion 30 of the cold reserving material container 3B or 3C and the water container 1B or 1E is placed so as to overlap from above onto the cold reserving material container 3B or 3C, operation of the arrangement is extremely simple.

With a sixth aspect of the present invention, because the cold reserving material container 3B, on which the water container 1B is arranged to be placed overlappingly from above, has the truncated conical shape with the lower edge of the outer peripheral skirt portion 31 being the grounded portion 31*a*, and the cold reserving material containing recess 30 that is formed on the upper surface side constitutes the downwardly protruding portion 32 at the rear surface side, a space that is cut off from the exterior is formed between the downwardly protruding portion 32 containing the cold reserving material 2 and the outer peripheral skirt portion 31, and by the heat insulating and heat retaining effects of air inside this space, the cooling action of the cold reserving materials 2 is sustained longer.

With a seventh aspect of the present invention, because the lower end of the downwardly protruding portion 32 of the cold reserving material container 3B is in a non-grounded state, direct heat transfer between a ground surface, such as the ground on which the water drinking container is placed, etc., and the downwardly protruding portion 32 is prevented, and the cooling action of the cold reserving material 2 is sustained correspondingly longer.

With an eighth aspect of the present invention, because the cold reserving material 2 can be contained in the cold reserving material containing portion 6 that is disposed at the bottom rear surface of the water containing recess 10 of the water container 1C, the water drinking container can be arranged from just the water container 1C and the cold reserving material 2, thereby correspondingly improving handling properties and making scattering and loss of components less likely to occur.

With a ninth aspect of the present invention, because the cold reserving material 2 can be contained in the pocket 7 that is disposed at the bottom rear surface of the water containing recess 10 of the water container 1D, the water drinking container can be arranged from just the water container 1D and the cold reserving material 2, and in addition, because the water container 1D is formed of a flexible sheet and can be folded, the merits of not being bulky during storage or transport and being further improved in handling property are provided.

What is claimed is:

1. A water drinking container for animals comprising:
    a water container, having an upwardly-open, water containing recess;
    a cold reserving material contained in a bag or a case;
    a cold reserving material holding means holding the cold reserving material with the bag or case thereof in a state of contact with a bottom rear surface of the water containing recess of the water container, the water container and the cold reserving material holding means being detachably attached to each other to permit the removal of the cold reserving material,
    the cold reserving material holding means comprises a cold reserving material container, having an upwardly-open, cold reserving material containing recess,
    the water container is arranged to be placed on the cold reserving material container, having the cold reserving material contained in the cold reserving material containing recess, with the water containing recess being fit in the cold reserving material containing recess, the cold reserving material container having a truncated conical shape with a lower edge of an outer peripheral skirt portion being a grounded portion, and the cold reserving material containing recess formed on an upper surface side of the cold reserving material container forming a downwardly protruding portion at a rear surface side, and the lower end of the downwardly protruding portion of the cold reserving material container being positioned higher than the grounded portion.

* * * * *